United States Patent
Kim et al.

(10) Patent No.: US 10,598,890 B2
(45) Date of Patent: Mar. 24, 2020

(54) LENS ASSEMBLY AND ELECTRONIC DEVICE INCLUDING THE SAME

(71) Applicant: Samsung Electronics Co., Ltd, Gyeonggi-do (KR)

(72) Inventors: Seung-Yong Kim, Gyeonggi-do (KR); Byung-Kwon Kang, Gyeonggi-do (KR); Hyun-Jun Shin, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 258 days.

(21) Appl. No.: 15/368,551

(22) Filed: Dec. 2, 2016

(65) Prior Publication Data
US 2017/0160511 A1 Jun. 8, 2017

(30) Foreign Application Priority Data
Dec. 4, 2015 (KR) .......................... 10-2015-0172378

(51) Int. Cl.
*G02B 7/02* (2006.01)
*G02B 13/00* (2006.01)

(52) U.S. Cl.
CPC ........... *G02B 7/021* (2013.01); *G02B 13/002* (2013.01)

(58) Field of Classification Search
CPC ............................. G02B 7/021; G02B 13/002
USPC ................................ 359/811, 819, 820, 740
See application file for complete search history.

(56) References Cited

U.S. PATENT DOCUMENTS

| | | | | |
|---|---|---|---|---|
| 6,014,269 A | * | 1/2000 | Nomura | G02B 7/102 359/700 |
| 2012/0314122 A1 | * | 12/2012 | Yamashita | G02B 5/1895 348/360 |

* cited by examiner

*Primary Examiner* — James R Greece

(57) ABSTRACT

A lens assembly according to the present disclosure includes at least one lens, a spacer, and a barrel. The at least one lens having an effective region configured to refract light, a flange region formed on at least a part surrounding the effective region, and a first cut formed on a sub region of the flange region. The spacer includes a second cut formed to correspond to the first cut and is configured to maintain a distance between multiple lenses mounted in the barrel. Moreover, the barrel is configured to receive the at least one lens and the spacer, in which the lens and the spacer are disposed inside the barrel such that the first cut and the second cut correspond to a third cut formed on an outer circumferential surface of the barrel. Various embodiments of the lens assembly and an electronic device including the same are described herein.

18 Claims, 9 Drawing Sheets

LENS ASSEMBLY AND ELECTRONIC DEVICE INCLUDING THE SAME

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Dec. 4, 2015 and assigned Serial No. 10-2015-0172378, the entire disclosure of which is incorporated herein by reference.

TECHNICAL FIELD

Various embodiments of the present disclosure relate to an electronic device, for example, a lens assembly for providing a photographing function and an electronic device including the lens assembly.

BACKGROUND

An electronic device, for example, a camera capable of capturing still images or moving images has already been popularized. Recently, an electronic device such as a digital camera, a video camera, or the like, having a solid image sensor, for example, a charge coupled device, a complementary metal-oxide semiconductor, etc., has come into wide use. An electronic device using a solid image sensor like a CCD or a CMOS gradually substitutes for an optical device adopting a film scheme because of easiness in storage, copy, and movement of images when compared to the film-scheme optical device.

To obtain high-quality images and/or videos, a lens assembly and/or an electronic device may include at least one lens. Depending on specifications required for the lens assembly or the electronic device, for example, a high-performance lens assembly capable of obtaining high resolution and high-brightness images may include a plurality of lenses.

As the integration of the solid image sensor increases, an environment is provided in which high-quality images and/or videos may be captured even in a small-size electronic device, but there may be a limitation in reducing the seeming size of the lens assembly. For example, as the number of lenses included in the lens assembly increases and the diameter (or radius) of the lens increases, photographing performance may increase. In this case, however, a space for mounting the lens assembly in the small-size electronic device may be difficult to secure.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide a lens assembly which is easy to miniaturize while contributing to obtaining high-quality images and/or videos, and an electronic device including the lens assembly.

According to an embodiment of the present disclosure, there is provided a lens assembly including a lens that includes an effective region that refracts light, a flange region formed on at least a part around the effective region, and a first cut formed on a first sub region of the flange region, a spacer that includes a second cut formed to correspond to the first cut, and a barrel configured to receive the lens and the spacer, in which the lens and the spacer are disposed inside the barrel such that the first cut and the second cut correspond to a third cut formed on an outer circumferential surface of the barrel.

According to another embodiment of the present disclosure, there is provided an electronic device including a lens in which a first cut is formed on a first sub region of a flange, a spacer in which a second cut is formed on a second sub region, and a barrel in which a third cut is formed on a third sub region of an edge portion, in which the first sub region, the second sub region, and the third sub region are disposed to correspond to each other.

According to another embodiment of the present disclosure, there is provided a lens assembly including at least one lens comprising a circular effective region that refracts light and a flange formed along a circumference of the effective region, in which the flange comprises at least one first D-shape plane and a portion of the effective region protrudes outwardly from the first D-shape plane.

Other embodiments, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
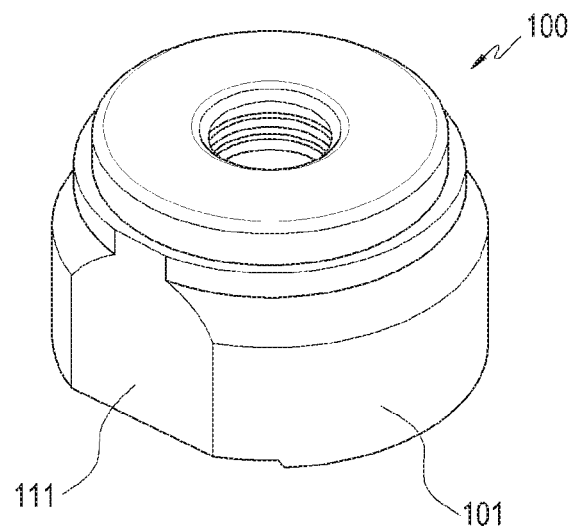
FIG. 1 illustrates a perspective view of a lens assembly according to various embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure will be disclosed with reference to the accompanying drawings. However, the description is not intended to limit the present disclosure to particular embodiments, and it should be construed as including various modifications, equivalents, and/or alternatives according to the embodiments of the present disclosure. In regard to the description of the drawings, like reference numerals refer to like elements.

In the present disclosure, an expression such as "A or B," "at least one of A or/and B," or "one or more of A or/and B" may include all possible combinations of together listed items. For example, "A or B," "at least one of A and B," or "one or more of A or B" may indicate the entire of (1) including at least one A, (2) including at least one B, or (3) including both at least one A and at least one B.

Expressions such as "first," "second," "primarily," or "secondary," used herein may represent various elements regardless of order and/or importance and do not limit corresponding elements. For example, a first user device and a second user device may represent different user devices regardless of order or importance. For example, a first element may be named as a second element without departing from the right scope of the various exemplary embodiments of the present disclosure, and similarly, a second element may be named as a first element.

When it is described that an element (such as a first element) is "operatively or communicatively coupled with/ to" or "connected" to another element (such as a second element), the element can be directly connected to the other element or can be connected to the other element through another element (e.g., a third element). However, when it is described that an element (such as a first element) is "directly connected" or "directly coupled" to another element (such as a second element), it means that there is no intermediate element (such as a third element) between the element and the other element.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a CPU or an application processor) that can perform a corresponding operation by executing at least one software program stored at a memory device.

The terms used in the present disclosure are for the purpose of describing particular exemplary embodiments only and are not intended to be limiting. The singular forms are intended to include the plural forms as well, unless the context clearly indicates otherwise. The term "include" or "has" used in the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

All of the terms used herein including technical or scientific terms have the same meanings as those generally understood by an ordinary skilled person in the related art unless they are defined other. The terms defined in a generally used dictionary should be interpreted as having meanings that are the same as or similar with the contextual meanings of the relevant technology and should not be interpreted as having ideal or exaggerated meanings unless they are clearly defined in the present disclosure. In some case, terms defined in the present disclosure cannot be analyzed to exclude the present exemplary embodiments.

In various embodiments of the present disclosure, an electronic device may be an arbitrary device including a lens assembly and may be referred to as a terminal, a portable terminal, a mobile terminal, a communication terminal, a portable communication terminal, a portable mobile terminal, a display, or the like.

For example, the electronic device may be a smart phone, a cellular phone, a navigation device, a game console, a television (TV), a vehicle head unit, a laptop computer, a tablet computer, a personal media player (PMP), a personal digital assistant (PDA), or the like, which has a lens assembly mounted thereon. The electronic device may be implemented with a pocket-size portable communication terminal having a wireless communication function. The electronic device may be a flexible device or a flexible display.

The electronic device may communicate with an external electronic device such as a server or may work by cooperating with the external electronic device. For example, the electronic device may transmit an image captured by a camera and/or position information detected by a sensor unit to the server over a network. A network may be, but not limited to, a mobile or cellular communication network, a local area network (LAN), a wireless local area network (WLAN), a wide area network (WAN), Internet, a small area network (SAN), or the like.

FIG. 1 illustrates a perspective view of a lens assembly 100 according to various embodiments of the present disclosure.

Figure 4:
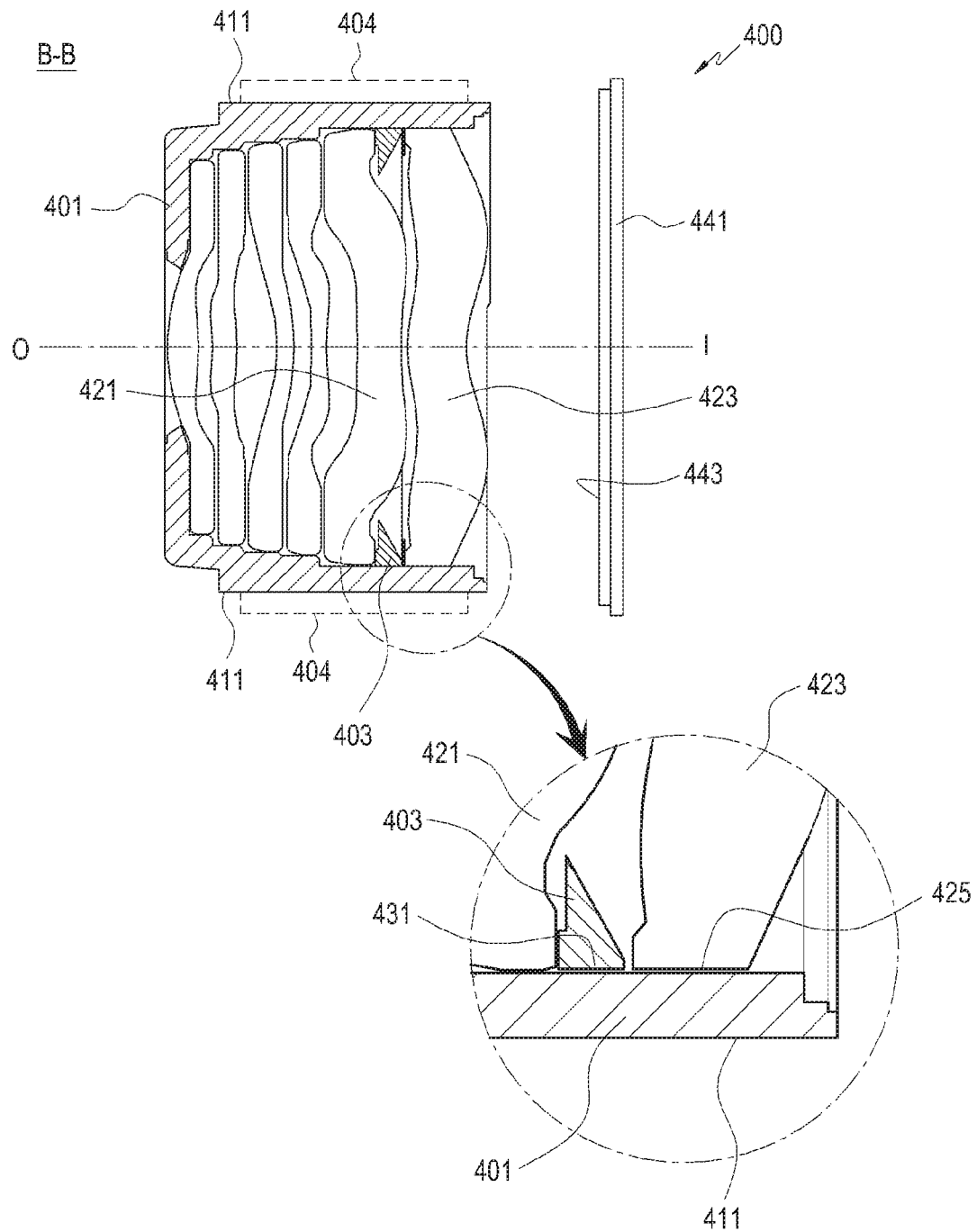
FIG. 4 illustrates a cross-sectional view of an electronic device including a lens assembly according to various embodiments of the present disclosure.

Referring to FIG. 1, the lens assembly 100 according to various embodiments of the present disclosure may include a barrel 101 that receives at least one lens. The barrel 101 may be, globally, in a cylindrical shape and may include, on a top surface thereof, an opening into which light is incident. The lens received in the barrel 101 is exposed through the opening to refract the light (e.g., image information about an object) incident from the outside. According to various embodiments, the barrel 101 may include a D-shape plane 111 formed on a partial region (e.g., a sub region) of an outer circumferential surface thereof. Herein, the 'D-shape plane' may mean an edge portion in a circular or curved shape or a linear or plane portion formed by removing a part of a curved surface. In the following description, the 'D-shape plane' may be referred to as 'D cut' or 'nth cut'. Referring to FIG. 4, a driving device (e.g., a magnetic portion, a coil, a shape memory alloy, etc.) for generating a driving force for operation such as auto focusing, optical hand-shaking correction, or the like may be disposed in the barrel 101. According to various embodiments, the magnetic portion may be disposed on the D-shape plane 111.

Figure 2:
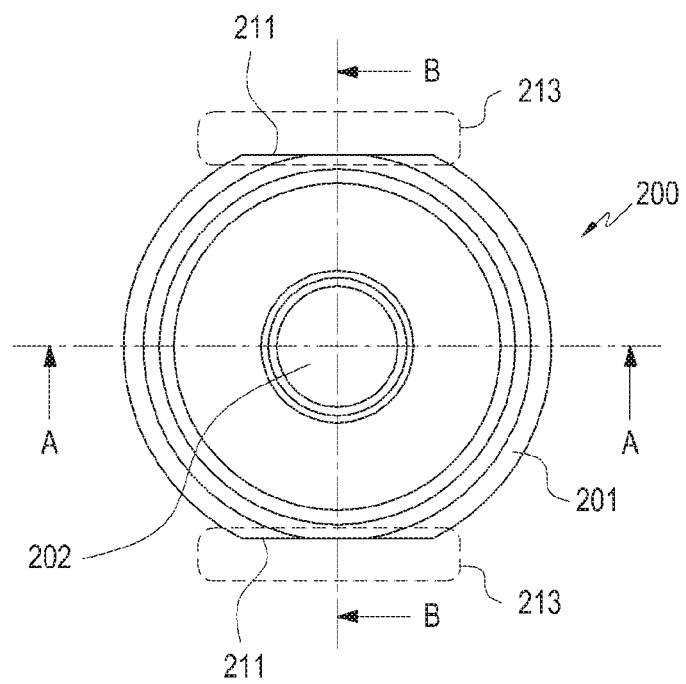
FIG. 2 illustrates a plane view of a lens assembly according to various embodiments of the present disclosure.

FIG. 2 illustrates a plane view of a lens assembly 200 according to various embodiments of the present disclosure.

Referring to FIG. 2, the lens assembly 200 according to various embodiments of the present disclosure may include a barrel 201 including a D-shape plane 211 formed on a partial region of an outer circumferential surface thereof, e.g., a sub region 213. For example, although being globally in a cylindrical shape, the barrel 201 may include a plane portion formed by removing a part of the outer circumferential surface. As a part of the outer circumferential surface of the barrel 201 globally in the cylindrical shape is removed, the size (e.g., volume) of the lens assembly 200 may be reduced. According to various embodiments, the lens assembly 200 may include a lens 202 exposed on a surface (e.g., a top surface) of the barrel 201 as being received in the barrel 201.

Figure 3:
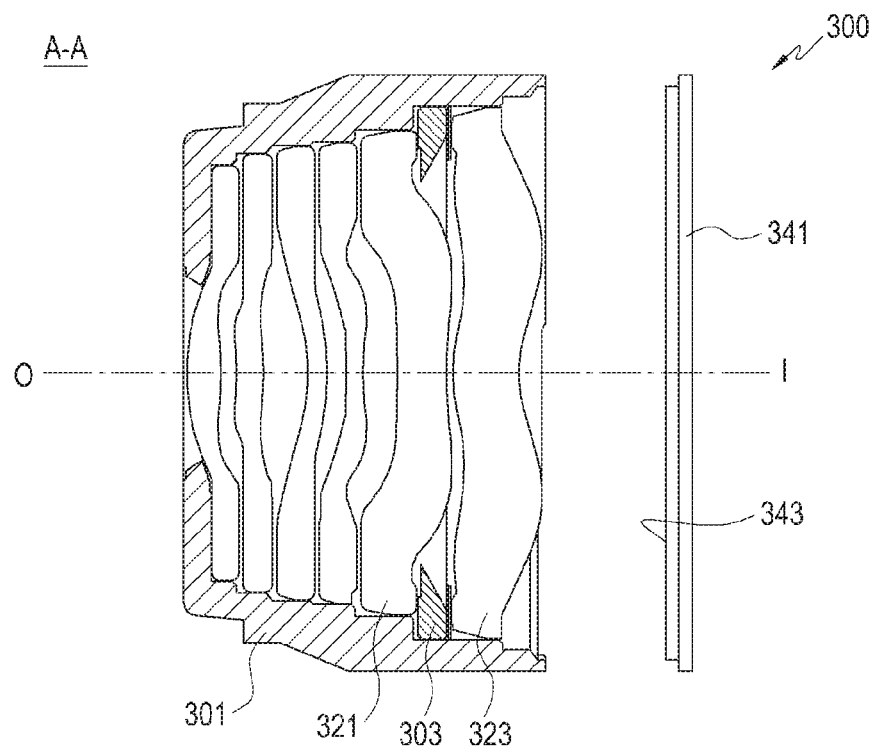
FIG. 3 illustrates a cross-sectional view of an electronic device including a lens assembly according to various embodiments of the present disclosure.

FIG. 3 illustrates a cross-sectional view of an electronic device 300 including a lens assembly after a part of the electronic device 300 is cut, according to various embodiments of the present disclosure, and may include, for example, a cross section of the lens assembly 200, cut along a line A-A shown in FIG. 2.

Referring to FIG. 3, the electronic device 300 according to various embodiments of the present disclosure may include a barrel 301 that receives at least one of lenses 321 and 323 and an image sensor 343.

The plurality of lenses 321 and 323 may be arranged in the barrel 301 along an optical axis O-I, e.g., from an object side O to an image sensor side I. The lenses 321 and 323 refract the incident light from the object side O to the barrel 301 to cause the light to be incident into an imaging surface of the image sensor 343. It should be noted that although 6 lenses are arranged inside the barrel 301 in FIG. 3, reference numerals are given to only some of the 6 lenses for brevity of the drawings. According to various embodiments, the number of lenses mounted on the electronic device 300 is not necessarily limited to 6. For example, depending on specifications required for the electronic device 300, the number of lenses may be greater than or less than 6. The lenses 321 and 323 may have identical diameters from the lens disposed in the object side O to the lens disposed in the image sensor side I, or may sequentially have greater diameters toward the image sensor side I. In an embodiment, some lenses may have identical diameters and some other lenses may sequentially have greater diameters toward the image sensor side I.

The image sensor 343 is mounted on a circuit board 341 and arranged in alignment with the optical axis O-I of the lenses 321 and 323. The image sensor 343 detects contrast information, grayscale information, color information, and so forth regarding an object from the light incident through the lenses 321 and 323 and obtains an image for the object. For example, the electronic device 300 may include a processor, a memory, a display, and the like that are not shown, the processor may generate an image based on information detected by the image sensor 343, and the generated image (and/or image file) may be stored in a memory or output through a display.

According to various embodiments, the lens assembly (e.g., the lens assemblies 100 and 200 shown in FIG. 1 and/or FIG. 2) and/or the electronic device 300 may include at least one spacer 303 disposed between two adjacent lenses, if including a plurality of lenses. The spacer 303 maintains a space between two adjacent lenses (e.g., the lenses 321 and 323). According to various embodiments, the spacer 303 may have a thickness (for example, measured along the optical axis O-I) varying depending on a position of the spacer 303. For example, a spacer disposed between the lens closest to the object side O and a lens adjacent thereto may have a smaller thickness than a spacer disposed between the lens closest to the image sensor side I and a lens adjacent thereto. In an embodiment, spacers may be disposed between some of the lenses and no space may be disposed between some other of the lenses.

FIG. 4 is a cross-sectional view of an electronic device 400 including a lens assembly after a part of the electronic device 300 is cut, according to various embodiments of the present disclosure, and may include, for example, a cross section of the lens assembly 200, cut along a line B-B shown in FIG. 2.

Referring to FIG. 4, the electronic device 400 according to various embodiments of the present disclosure may include a barrel 401 that receives at least one lenses 421 and 423 and an image sensor 443.

The plurality of lenses 421 and 423 may be arranged in the barrel 401 along the optical axis O-I, e.g., from the object side O to the image sensor side I. The lenses 421 and 423 refract the incident light from the object side O to the barrel 401 to cause the light to be incident into an imaging surface of the image sensor 443. The lenses 421 and 423 may have identical diameters from the lens disposed in the object side O to the lens disposed in the image sensor side I, or may sequentially have greater diameters toward the image sensor side I. In an embodiment, some lenses may have identical diameters, and some other lenses may have greater diameters which may be disposed on the image sensor side.

The image sensor 443 is mounted on a circuit board 441 and arranged in alignment with the optical axis O-I of the lenses 421 and 423. The image sensor 443 detects contrast information, grayscale information, color information, and so forth regarding an object from the light incident through the lenses 421 and 423 and obtains an image for the object.

According to various embodiments, the lens assembly (e.g., the lens assemblies 100 and 200 shown in FIG. 1 and/or FIG. 2) and/or the electronic device 400 may include at least one spacer 403 disposed between two adjacent lenses, if including a plurality of lenses. The spacer 403 maintains a space between two adjacent lenses (e.g., the lenses 421 and 423). According to various embodiments, the spacer 403 may have a thickness (for example, measured along the optical axis O-I) varying depending on a position of the spacer 303. For example, a spacer disposed between the lens closest to the object side O and a lens adjacent thereto may have a smaller thickness than a spacer disposed between the lens closest to the image sensor side I and a lens adjacent thereto. In an embodiment, spacers may be disposed between some of the lenses and no space may be disposed between some other of the lenses.

According to various embodiments, at least some of the lenses 421 and 423 and/or the spacer 403 may include planes 425 and 431 corresponding to a D-shape plane 411 of the barrel 401 (e.g., the D-shape planes 111 and 211 of FIG. 1 and/or FIG. 2). For example, the lenses 421 and 423 and/or the spacer 403 may globally have a disc shape or a ring shape, but may include a linear edge portion (e.g., the planes 425 and 431) by removing a partial region (e.g., a sub region) of the edge. The plane portion included in the lens 423 and/or the spacer 403, e.g., the D cut will be described in more detail with reference to FIG. 7.

In an embodiment, the lenses 421 and 423 and/or the spacer 403 may be received inside the barrel 401 such that the D-shape planes or the D cuts (e.g., the planes 425 and 431) formed on the lenses 421 and 423 and/or the spacer 403 are aligned to correspond to the D-shape plane 411 formed on the barrel 401. The diameter (or radius) of the lens in a portion where the D cut (e.g., the plane 425) is formed may be less than that in the other portion (e.g., a portion where the D cut is not formed).

According to various embodiments, the lenses 421 and 423 and/or the barrel 401 may perform auto focusing while reciprocating with respect to the image sensor 443 along the optical axis O-I. When auto focusing is performed, various driving devices, e.g., a voice coil motor, a step motor, an ultrasonic motor, a piezoelectric device, and the like may be used. In an embodiment, the driving device may be mounted on the D-shape plane 411 formed on the outer circumferential surface of the barrel 401. For example, if the driving device is implemented with a voice coil motor including a coil portion and the magnetic portion 404, the magnetic portion 404 may be mounted on the D-shape plane 411.

Figure 5:
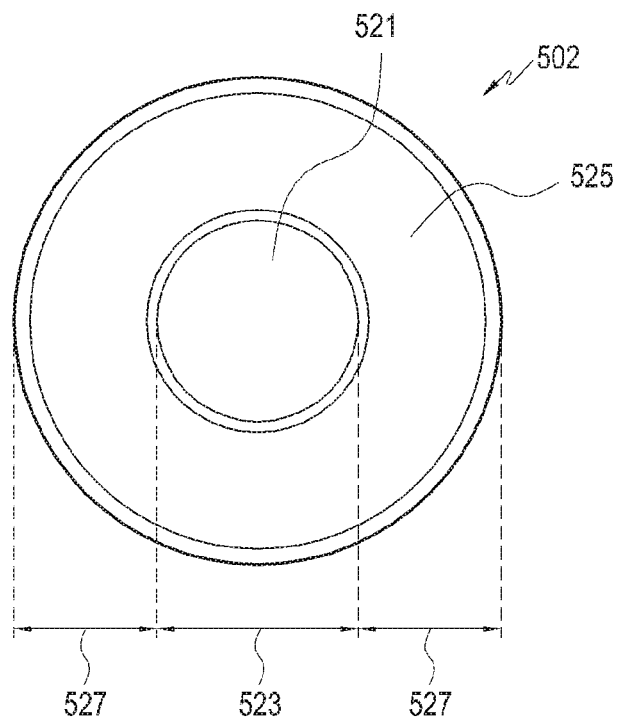
FIG. 5 illustrates a plane view of a lens of a lens assembly according to various embodiments of the present disclosure.
Figure 6:
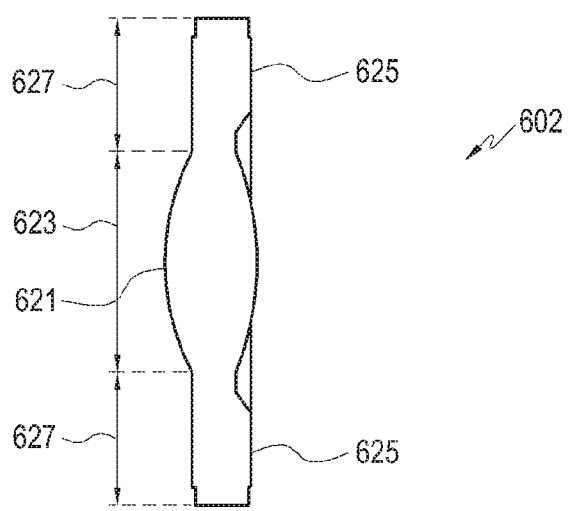
FIG. 6 illustrates a cross-sectional view of a lens of a lens assembly according to various embodiments of the present disclosure.

FIG. 5 is a plane view for describing a lens of a lens assembly 502 according to various embodiments of the present disclosure. FIG. 6 is a plane view illustrating a lens of a lens assembly 602 according to various embodiments of the present disclosure.

Referring to FIGS. 5 and 6, a description will be made of meanings of terms for describing various embodiments.

Referring to FIGS. 5 and 6, lenses 502 and 602 may include effective regions 523 and 623 and flange regions 527 and 627 formed along circumferences of the effective regions 523 and 623, respectively. The effective regions 523 and 623 are regions for refracting incident light, and the lenses 502 and 602 may include lens portions 521 and 621 formed on the effective regions 523 and 623, respectively. For example, the lens portions 521 and 621 may refract incident light by having a positive or negative refractive force. On the flange regions 527 and 627 may be formed flanges 525 and 625 extending outwardly with respect to the lens portions 521 and 621 along the circumferences of the lens portions 521 and 621. The flanges 525 and 625 may provide a means for mounting and fixing the lenses 502 and 602 onto another structure, e.g., the barrel 401 shown in FIG. 4. For example, as the flanges 525 and 625 are bound or fixed to the inside of the barrel (e.g., the barrel 401 of FIG. 4), the lenses 502 and 602 may be mounted inside the barrel without the structure of the barrel being interfered by the effective regions 523 and 623.

According to various embodiments, the D cut is formed by removing a part of the flanges 525 and 625, thereby miniaturizing the lens assembly (e.g., the lens assemblies 100 and 200 of FIG. 1 and/or FIG. 2) and/or an electronic device (e.g., the lens assemblies 300 and 400 of FIG. 3 and/or FIG. 4) while guaranteeing optical performance thereof. For example, the optical performance of the lens assembly and/or the electronic device may be guaranteed by maintaining the effective regions 523 and 623 of the lenses 502 and 602, and the lens assembly and/or the electronic device may be miniaturized by removing a part of the flanges 525 and 625. Next, an embodiment of the miniaturized lens which maintains the effective region will be described with reference to FIG. 7.

Figure 7:
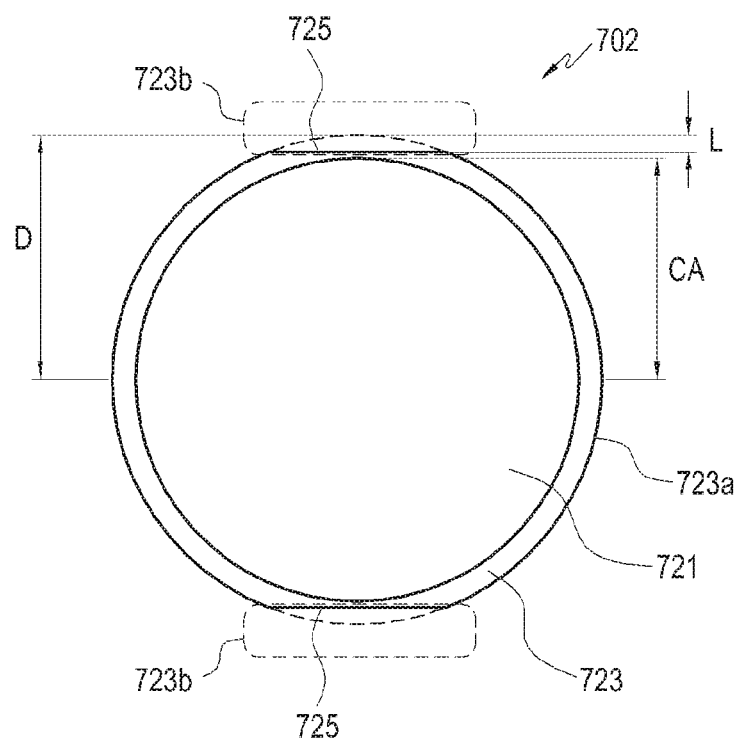
FIG. 7 illustrates a plane view of one a lens of a lens assembly according to various embodiments of the present disclosure.

FIG. 7 is a plane view of one lens 702 of a lens assembly according to various embodiments of the present disclosure.

Referring to FIG. 7, one lens of the above-described lens assembly may include a first cut 725 (e.g., the D-shape plane 425 of FIG. 4) formed on a sub region 723*b* in a flange region 723*a*. The lens 702 may include a lens portion 721 formed in an effective region and a flange 723 formed on a circumference of the lens portion 721. The effective region, for example, the lens portion 721 may have a circular shape, and the flange 723 may have a ring shape formed on a circumference of the lens portion 721. According to various embodiments, in the sub region 723*b* in a region where the flange 723 is formed, a part of an edge of the flange 723 may have a linear shape. For example, the edge of the flange 723 may globally have a circular shape and a portion thereof may include the first cut 725 in a linear shape. According to an embodiment, a pair of first cuts 725 may be formed on edges of the flange 723, respectively, and may be arranged symmetrically with respect to the effective region, e.g., the center of the lens portion 721. For example, in FIG. 7, the first cuts 725 may be formed in an upper portion and a lower portion of the lens portion 721, respectively, and the first cuts 725 may be arranged symmetrically with respect to the lens portion 721.

In an embodiment, the lens 702 may satisfy:

$$CA \leq D-L \leq 1.08CA \quad (1),$$

wherein 'D' indicates a radius of the lens 702 (e.g., a radius of a portion where the first cut 725 is not formed), 'L' indicates a length of a removed portion of the flange 723 after formation of the first cut 725, and 'CA' indicates a radius of the effective region, e.g., a radius of the lens portion 721. In Equation (1), 'D-L' indicates a distance from the center of the lens portion 721 to the first cut 725.

According to Equation (1), in a structure where the first cut 725 is formed, the lens portion 721 is surrounded by the flange 723. For example, the flange 723 may have a ring shape that encloses the entire circumference of the lens portion 721 while including the first cut 725.

Figure 8:
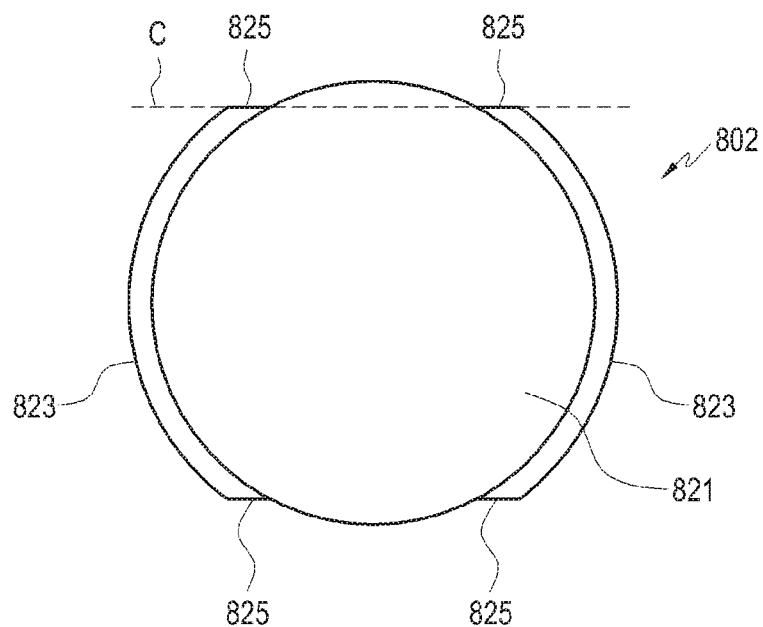
FIG. 8 illustrates a plane view of a lens of lens assembly according to various embodiments of the present disclosure.

FIG. 8 is a plane view of another lens 802 of the plurality of lenses of a lens assembly according to various embodiments of the present disclosure.

Referring to FIG. 8, one lens 802 of the plurality of lenses of the above-described lens assembly may include a first cut 825 (e.g., the D-shape plane 425 of FIG. 4) formed on a sub region in a flange region. The lens 802 may include a lens portion 821 formed in an effective region and a flange 823 formed on a circumference of the lens portion 821. The effective region, for example, the lens portion 821 may have a circular shape, and the flange 823 may have a ring shape formed on a circumference of the lens portion 821. According to various embodiments, in a sub region in a region where the flange 823 is formed, a part of an edge of the flange 823 may have a first cut 825. In an embodiment, a pair of or two pairs of first cuts 825 may be arranged symmetrically with respect to the center of the lens portion 821, and a portion of an effective region, e.g., a portion of the lens portion 821 may protrude outwardly from the first cut 825.

In an embodiment, the lens 802 may satisfy:

$$D-L<CA \qquad (2),$$

wherein like in the embodiment shown in FIG. 7, 'D' indicates a radius of the lens 802, 'L' indicates a length of a removed portion of the flange 823 after formation of the first cut 825, and 'CA' indicates a radius of the effective region, e.g., a radius of the lens portion 821. In Equation (2), 'D-L' indicates a distance from the center of the lens portion 821 to the first cut 825 (e.g., a virtual straight line C passing through the first cut 825). In the current embodiment, the first cut(s) 825 are disposed spaced apart from each other in an upper portion and a lower portion of the lens portion 821, respectively. For example, the first cuts 825 may be positioned on opposite sides of a portion of the lens portion 821 protruding outwardly. When the virtual straight line C passing through the first cut 825 is drawn, the straight line C may be situated to partially traverse an effective region of the lens 802. According to Equation (2), in the structure where the first cut 825 is formed, the lens portion 823 is disposed on opposite sides of the lens portion 821.

Figure 9:
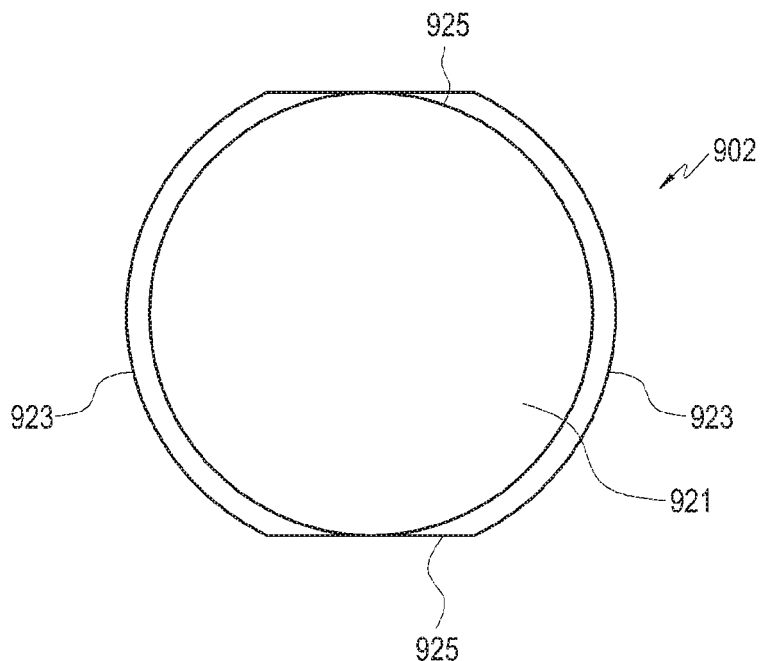
FIG. 9 illustrates a plane view of a lens of a lens assembly according to various embodiments of the present disclosure.

FIG. 9 is a plane view illustrating one lens 902 of a plurality of lenses of a lens assembly according to various embodiments of the present disclosure.

Referring to FIG. 9, a lens 902 of the plurality of lenses of the lens assembly according to various embodiments of the present disclosure may include a ring-shape flange 923 formed on a circumference of a circular-shape lens portion 921, and may include a linear-shape first cut 925 formed after a part of an edge of the flange 923 is removed. When the first cut 925 is formed, the lens 902 may satisfy:

$$D-L=CA \qquad (3),$$

wherein like in the embodiment shown in FIG. 7, 'D' indicates a radius of the lens 902, 'L' indicates a length of a removed portion of the flange 923 after formation of the first cut 925, and 'CA' indicates a radius of the effective region, e.g., a radius of the lens portion 921. In Equation (3), 'D-L' indicates a distance from the center of the lens portion 921 to the first cut 925. In the current embodiment, the first cut 925 may be positioned in a distance equal to a radius of the lens portion 921 from the center of the lens portion 921.

Figure 10:
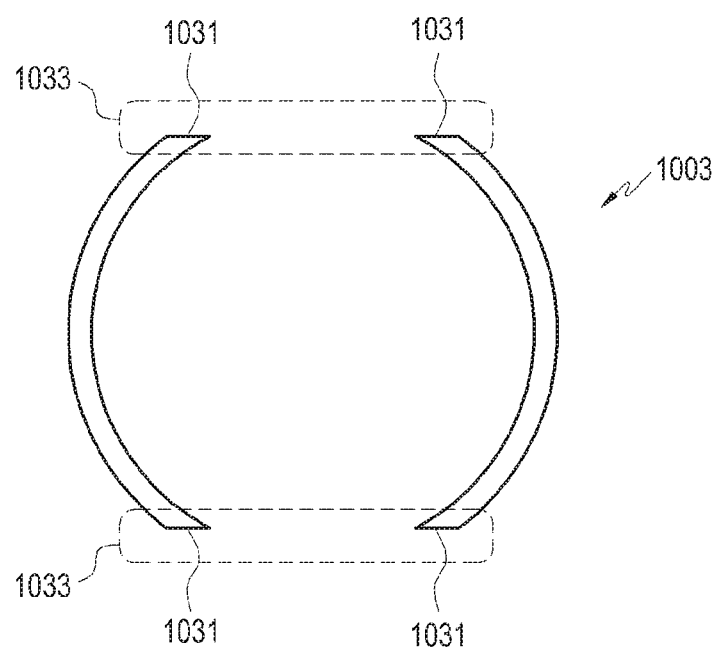
FIG. 10 illustrates a plane view of a spacer of a lens assembly according to various embodiments of the present disclosure.

FIG. 10 is a plane view of one spacer 1003 in a plurality of spacers of a lens assembly according to various embodiments of the present disclosure.

In the foregoing embodiments, it has been described that a spacer (e.g., the spacer 403 of FIG. 4) is disposed between adjacent lenses (e.g., the lenses 421 and 423 of FIG. 4) to maintain an interval between the lenses. For example, the spacer 1003 may maintain an interval between adjacent lenses without being interfered by light refracted by the lens portion (e.g., the effective region).

According to an embodiment, the spacer 1003 may be formed to correspond to a shape of the flange (e.g., the flange 823 of FIG. 8). For example, referring to FIG. 10, the spacer 1003 may be provided as one pair, and may have a shape corresponding to the flange(s) 823 of the lens 802 shown in FIG. 8. A second pair of spacers 1003 may be disposed to globally have a circular shape and may include a second cut 1031 formed in a sub region 1033. The second cut 1031 may be positioned to correspond to a first cut (e.g., the first cut 825 of FIG. 8) formed in a sub region of the flange (e.g., the flange 823 of FIG. 8).

When a first lens and a second lens are disposed having the spacer 1003 therebetween, flanges of the first lens and the second lens (e.g., the lenses 421 and 423 of FIG. 4) may face the spacer 1003, e.g., may contact the spacer 1003. In an embodiment, as the flanges of the first lens and the second lens face the spacer 1003, respectively, light refracted through the effective regions of the first lens and the second lens may arrive at the image sensor without being interfered by the spacer 1003.

Figure 11:
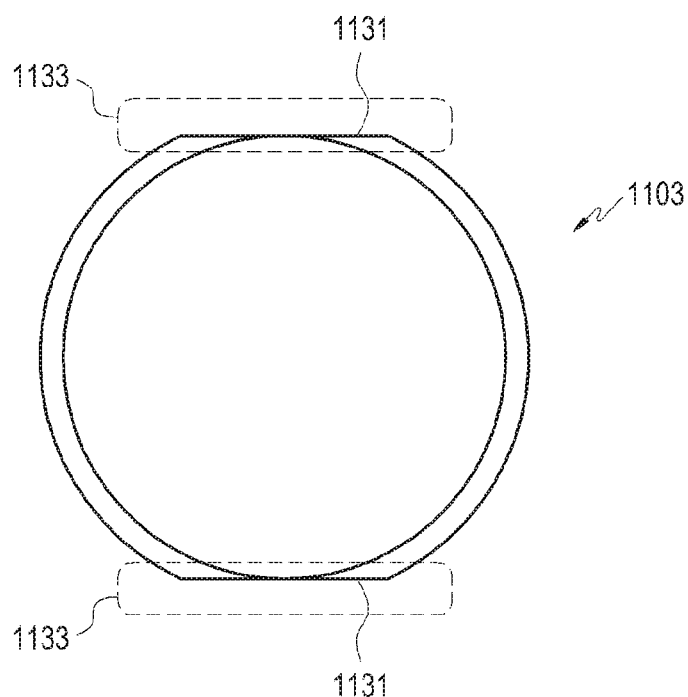
FIG. 11 illustrates a plane view of a spacer of a lens assembly according to various embodiments of the present disclosure.

FIG. 11 is a plane view illustrating a spacer 1103 of a plurality of spacers of a lens assembly according to various embodiments of the present disclosure.

In the foregoing embodiment, it has been described that the distance from the center of the effective region to the first cut, e.g., 'D-L' of Equation (1) is greater than or equal to the radius of the effective region. When the lens is disposed where the distance from the center of the effective region to the first cut is greater than or equal to the radius of the effective region, the spacer 1103 may have a ring shape (e.g., a closed loop shape) including a second cut 1131 formed in a sub region 1133.

Figure 12:
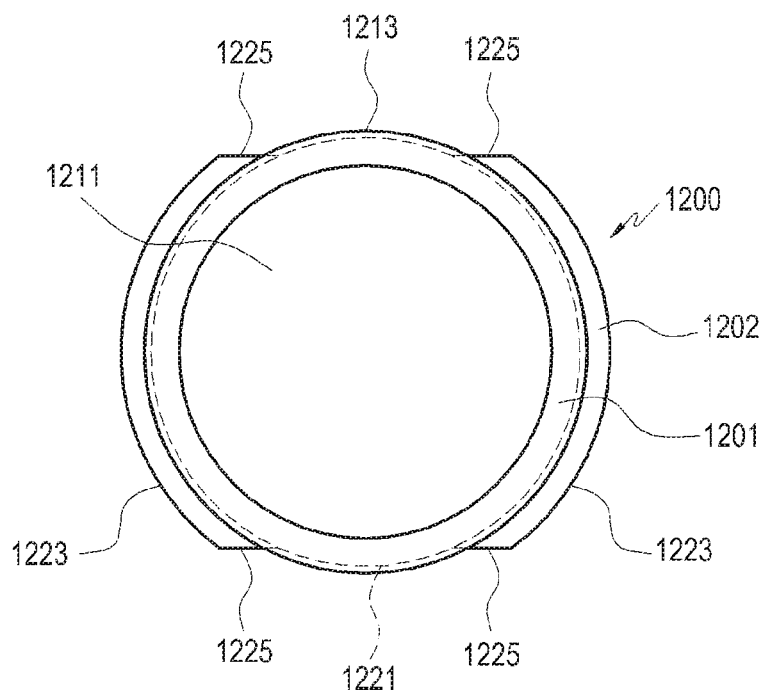
FIG. 12 illustrates a plane view of a plurality of lenses arranged in a lens assembly according to various embodiments of the present disclosure.

FIG. 12 is a plane view illustrating a plurality of lenses 1201 and 1202 arranged in a lens assembly 1200 according to various embodiments of the present disclosure.

It should be noted that when the plurality of lenses are arranged is illustrated using a plane view in FIG. 12, the spacer (the spacers 1003 and 1103 of FIG. 10 and/or FIG. 11) has been omitted to show relative sizes of the lenses 1201 and 1202. The relative sizes of the first lens 1201 and the second lens 1202 shown in FIG. 12 are not intended to limit the present disclosure, and may vary according to specifications required in a lens assembly or an electronic device to be manufactured and/or according to a mounting structure, or the like. According to an embodiment, the second lens 1202 may be disposed closer to an image sensor side than the first lens 1201, and the effective region of at least the second lens 1202 may have a greater radius than the effective region of the first lens 1201.

Referring to FIG. 12, a lens assembly 1200 (e.g., the lens assemblies 100 and 200 of FIG. 1 and/or FIG. 2) and/or an electronic device (e.g., the electronic devices 300 and 400 of FIG. 3 and/or FIG. 4) according to various embodiments of the present disclosure may include a first lens 1201 positioned on an object side and a second lens 1202 positioned on an image sensor side, and a diameter and/or a radius of the second lens 1202 may be greater than a diameter and/or a radius of the first lens 1201. In an embodiment, the effective region of the second lens 1202, for example, a lens portion 1221 that refracts light may have a diameter and/or a radius greater than the diameter and/or the radius of the first lens 1201. In another embodiment, the lens portion 1221 of the second lens 1202 may have a greater diameter than that of at least a lens portion 1211 of the first lens 1201. In another embodiment, the lens portion 1221 of the second lens 1202 may have a greater diameter than the entire diameter (e.g., a diameter including a flange 1213) of the first lens 1201.

According to an embodiment, a first cut 1225 may be formed on the second lens 1202, and the first cut 1225 may be formed in a sub region of the second lens 1202 at least based on the diameter of the first lens 1201. For example, the diameter of the second lens 1202 may be greater than that of the first lens 1201, and at least a part of the first cut 1225 may be formed outward with respect to the first lens 1201, e.g., the flange 1213 of the first lens 1201.

As such, the lens assembly according to various embodiments of the present disclosure may include a flange on a circumference of an effective region that refracts light and a lens including a D-shape plane in a sub region of the flange. The lens may secure optical performance by maintaining a designed effective region while being miniaturized in the entire size.

Figure 13:
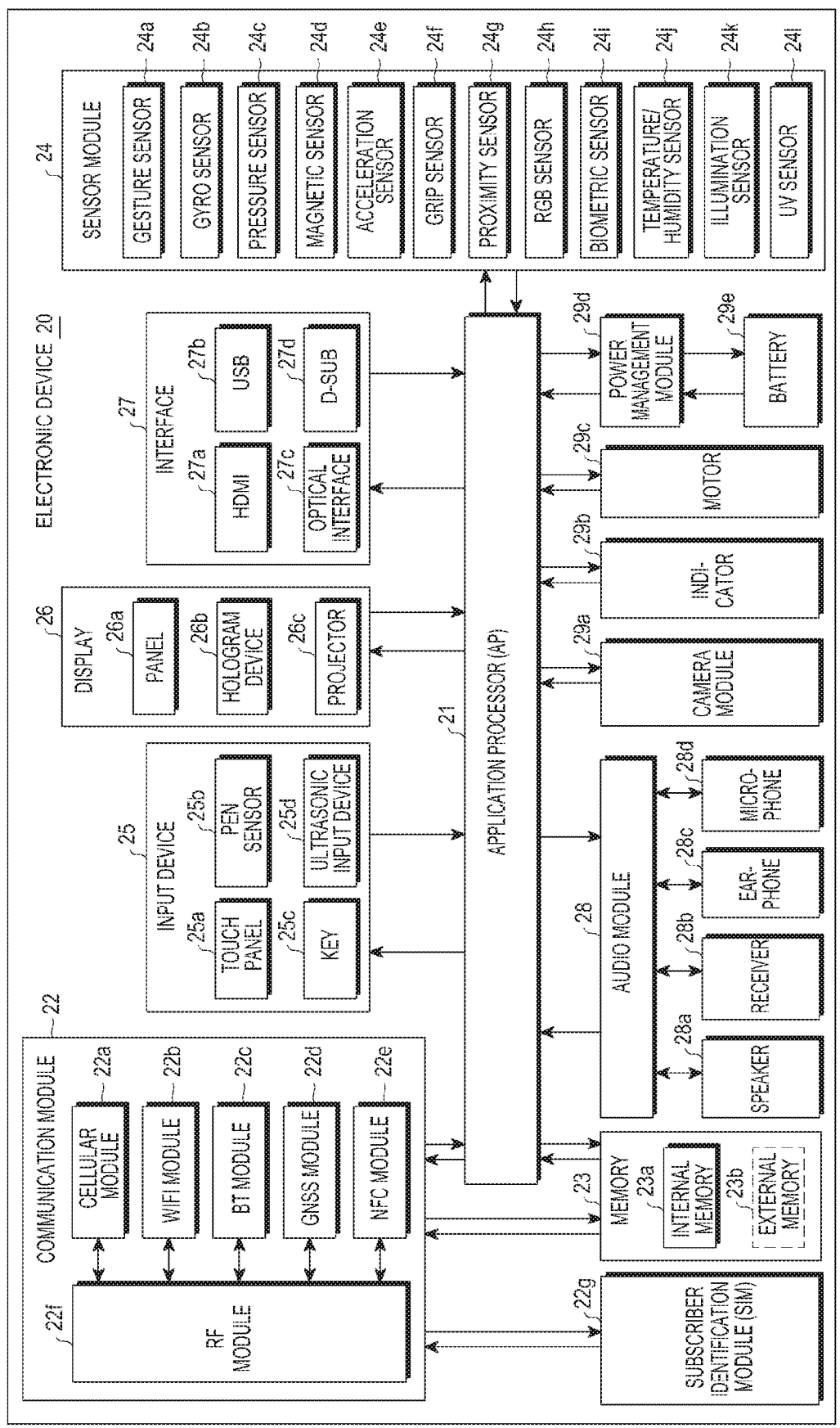
FIG. 13 illustrates a block diagram of an electronic device according to various embodiments of the present disclosure.

FIG. 13 is a block diagram illustrating an electronic device 20 according to various embodiments of the present disclosure.

Referring to FIG. 13, the electronic device 20 may include the entire lens assembly illustrated 100 in FIG. 1 or a part of the lens assembly 100, for example the barrel 101 illustrated in FIG. 1. The electronic device 20 may include one or more processors (e.g., application processors (APs)) 21, a communication module 22, a subscriber identification module (SIM) 22g, a memory 23, a sensor module 24, an input module 25, a display 26, an interface 27, an audio module 28, a camera module 29a, an indicator 29b, a motor 29c, a power management module 29d, and a battery 29e.

The AP 21 controls multiple hardware or software components connected to the AP 21 by driving an operating system (OS) or an application program, and performs processing and operations with respect to various data. The AP 21 may be implemented with, for example, a system on chip (SoC). According to an embodiment, the AP 21 may further include a graphic processing unit (GPU) and/or an image signal processor. The AP 21 may include at least some of the elements illustrated in FIG. 13 (e.g., the cellular module 22a). The AP 21 loads a command or data received from at least one of other elements (e.g., a non-volatile memory) into a volatile memory to process the command or data, and stores various data in the non-volatile memory.

The communication module 22 may include, for example, at least one of the cellular module 22a, a WiFi module 22b, a Bluetooth® (BT) module 22c, a GNSS module 22d, a near field communication (NFC) module 22e, and a radio frequency (RF) module 22f.

The cellular module 22a may provide, for example, a voice call, a video call, a text service, or an Internet service over a communication network. According to an embodiment, the cellular module 22a identifies and authenticates the electronic device 20 in a communication network by using the SIM 22g (e.g., a SIM card). According to an embodiment, the cellular module 22 performs at least one of functions that may be provided by the AP 21. According to an embodiment, the cellular module 22 may include a communication processor (CP).

Each of the WiFi module 22b, the BT module 22c, the GNSS module 22d, and the NFC module 22e may include, for example, a processor for processing data transmitted and received by a corresponding module. According to some embodiment, at least some (e.g., two or more) of the cellular module 22a, the WiFi module 22b, the BT module 22c, the GNSS module 22d, and the NFC module 22e may be included in one integrated chip (IC) or IC package.

The RF module 22f may, for example, transmit and receive a communication signal (e.g., an RF signal). The RF module 22f may include a transceiver, a power amplifier module (PAM), a frequency filter, a low noise amplifier (LNA), or an antenna. According to another embodiment, at least one of the cellular module 22a, the WiFi module 22b, the BT module 22c, the GNSS module 22d, and the NFC module 22e may transmit and receive an RF signal through the separate RF module.

The SIM (e.g., an SIM card) 22g may, for example, include a card including an SIM and/or an embedded SIM, and may include unique identification information (e.g., an integrated circuit card identifier (ICCID) or subscriber information (e.g., an international mobile subscriber identity (IMSI)).

The memory 23 may include an internal memory 23a or an external memory 23b. The internal memory 23a may, for example, include at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, NAND flash memory, NOR flash memory, etc.), and a solid state drive (SSD).

The external memory 23b may further include flash drive, for example, compact flash (CF), secure digital (SD), micro-SD, mini-SD, extreme Digital (xD), a multi-media card (MMC), or a memory stick. The external memory 23b may be functionally and/or physically connected with the electronic device 20 through various interfaces.

The sensor module 24 measures physical quantity or senses an operation state of the electronic device 20 to convert the measured or sensed information into an electric signal. The sensor module 24 may, for example, include at least one of a gesture sensor 24a, a gyro sensor 24b, a pressure sensor 24c, a magnetic sensor 24d, an acceleration sensor 24e, a grip sensor 24f, a proximity sensor 24g, an RGB sensor 24h, a biometric sensor 24i, a temperature/humidity sensor 24j, an illumination sensor 24k, and a ultraviolet (UV) sensor 241. Additionally or alternatively, the sensor module 24 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 24 may further include a control circuit for controlling at least one sensor included therein. In some embodiment, the electronic device 20 may further include a processor configured to control the sensor module 24 as part of or separately from the AP 21, to control the sensor module 24 during a sleep state of the AP 21.

The input module 25 may include, for example, a touch panel 25a, a (digital) pen sensor 25b, a key 25c, or an ultrasonic input device 25d. The touch panel 25a may use at least one of a capacitive type, a resistive type, an IR type, or an ultrasonic type. The touch panel 25a may further include a control circuit. The touch panel 25a may further include a tactile layer to provide tactile reaction to the user.

The (digital) pen sensor 25b may include a recognition sheet which is a part of the touch panel 25a or a separate recognition sheet. The key 25c may also include, for example, a physical button, an optical key, or a keypad. The ultrasonic input device 25d senses sound waves through a microphone (e.g., the microphone 28d) of the electronic device 20 using an input means that generates an ultrasonic signal, thereby checking data.

The display 26 may include a panel 26a, a hologram device 26b, or a projector 26c. The panel 26a may be implemented to be flexible, transparent, or wearable. The panel 26a may be configured with the touch panel 25a in one module. The hologram device 26a shows a stereoscopic image in the air by using interference of light. The projector 26c displays an image onto an external screen through projection of light. The screen may be positioned inside or outside the electronic device 20. According to an embodiment, the display 26 may further include a control circuit for controlling the panel 26a, the hologram device 26b, or the projector 26c.

According to an embodiment, the interface 27 may include a high-definition multimedia interface (HDMI) 27a, a universal serial bus (USB) 27b, an optical interface 27c, or a D-subminiature 27d. Additionally or alternatively, the interface 27 may include a mobile high-definition link (MHL) interface, an SD/multi-media card (MMC) interface, or an Infrared Data Association (IrDA) interface.

The audio module 28 bi-directionally converts sound and an electric signal. The audio module 28 processes sound information input or output through the speaker 28a, the receiver 28b, the earphone 28c, or the microphone 28d.

The camera module 29a is, for example, a device capable of capturing a still image or a moving image, and according to an embodiment, may include one or more image sensors (e.g., the image sensor 343 of FIG. 3), a lens (e.g., the lens assembly 100 of FIG. 1), an image signal processor (ISP), or a flash (e.g., an LED, a xenon lamp, etc.).

The power management module 29d manages power of the electronic device 20. According to an embodiment, the power management module 29d may include a power management integrated circuit (PMIC), a charger IC, or a battery fuel gauge. The PMIC may have a wired and/or wireless charging scheme. The wireless charging scheme includes a magnetic-resonance type, a magnetic induction type, and an electromagnetic type, and for wireless charging, an additional circuit, for example, a coil loop, a resonance circuit, or a rectifier may be further included. The battery gauge measures the remaining capacity of the battery 29e or the voltage, current, or temperature of the battery 29e during charging. The battery 29e may include a rechargeable battery and/or a solar battery.

The indicator 29b displays a particular state, for example, a booting state, a message state, or a charging state, of the electronic device 20 or a part thereof (e.g., the AP 21). The motor 29c converts an electric signal into mechanical vibration or generates vibration or a haptic effect. Although not shown, the electronic device 20 may include a processing device (e.g., a GPU) for supporting a mobile TV. The processing device for supporting the mobile TV processes media data according to, a standard such as digital multi-media broadcasting (DMB), digital video broadcasting (DVB), or MediaFlo®.

Each of the foregoing elements of the electronic device may be configured with one or more components, names of which may vary with a type of the electronic device. In various embodiments, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

A term "module" used herein may mean, for example, a unit including one of or a combination of two or more of hardware, software, and firmware. The "module" may be interchangeably used with a unit, a logic, a logical block, a component, or a circuit. The "module" may be a minimum unit or a portion of an integrated component. The "module" may be a minimum unit or a portion thereof performing one or more functions. The "module" may be implemented mechanically or electronically. For example, the "module" according to the embodiments may include at least one of an application-specific integrated circuit (ASIC) chip, field-programmable gate arrays (FPGAs), and a programmable-logic device performing certain operations already known or to be developed.

At least a part of a device (e.g., modules or functions thereof) or a method (e.g., operations) according to various embodiments may be implemented with a command stored in a computer-readable storage medium in the form of a programming module. When the instructions are executed by one or more processors (for example, the AP 21), the one or more processors may perform functions corresponding to the instructions. The computer-readable storage medium may be, for example, a memory included in the memory 23. At least some of the instructions may be implemented (for example, executed) by the processors. At least some of the programming modules may include, for example, modules, programs, routines, sets of instructions, or processes for performing one or more functions.

The computer readable recording medium includes magnetic optical media such as compact disc read only memory (CD-ROM) or digital versatile disc (DVD), magneto-optical media such as floptical disk, and a hardware device such as ROM, RAM, flash memory storing and executing program commands. Further, the program instructions include a machine language code created by a complier and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements according to various embodiments may be executed in a sequential, parallel, repetitive or heuristic manner. Also, some of the operations may be executed in different order or omitted, or may have additional different operations.

The embodiments disclosed in the present specification and drawings have been provided to easily describe the present disclosure and to help understanding of the present disclosure, and are not intended to limit the scope of the present disclosure. Therefore, it should be construed that the scope of the present disclosure includes any change or other various embodiments based on the technical spirit of the present disclosure as well as the embodiments described herein.

Figure 14:
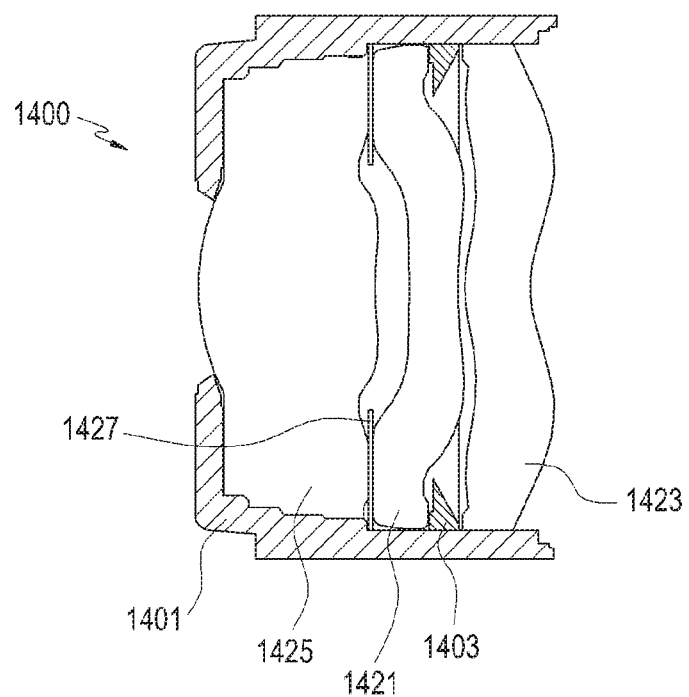
FIG. 14 illustrates a cross-sectional view of a lens assembly according to various embodiments of the present disclosure.

FIG. 14 is a cross-sectional view illustrating a lens assembly 1400 according to various embodiments of the present disclosure.

When the current embodiment is described, structures that may be easily understood from the foregoing embodiments will not be described in detail or may be described with reference to structures of the foregoing embodiments.

Referring to FIG. 14, a lens assembly 1400 according to various embodiments of the present disclosure may include at least one lens, or a plurality of lenses 1421, 1423, and 1425 and a barrel 1401 that receives the lenses 1421, 1423, and 1425. According to an embodiment, an iris 1427 is disposed between the lenses 1421, 1423, and 1425 to adjust the amount of light introduced through the lens assembly 1400.

Inside the barrel 1401 may be arranged the plurality of lenses 1421, 1423, and 1425 along an optical axis (e.g., the optical axis O-I of FIG. 4). The lenses 1421, 1423, and 1425 refract light incident from the object side to the barrel 1401 to cause the light to be incident into an imaging surface of an image sensor (e.g., the image sensor 443 of FIG. 4). The lenses 1421, 1423, and 1425 may have identical diameters from the lens 1425 disposed in the object side to the lens 1423 disposed in the image sensor side, or may sequentially have greater diameters toward the image sensor side. In an embodiment, some lenses may have identical diameters, and some other lenses may have greater diameters which may be disposed closer to the image sensor side. The image sensor (e.g., the image sensor 443 of FIG. 4) detects contrast information, grayscale information, color information, and so forth regarding an object from the light incident through the lenses 1421, 1423, and 1425 and obtains an image for the object.

According to various embodiments, the lens assembly 1400 (e.g., the lens assemblies 100 and 200 shown in FIG. 1 and/or FIG. 2) and/or an electronic device (e.g., the electronic device 400 of FIG. 4) may include at least one spacer 1403 disposed between two adjacent lenses, if including a plurality of lenses. The spacer 1403 maintains a space between two adjacent lenses (e.g., the lenses 1421 and 1423).

According to various embodiments, at least some of the lenses 1421 and 1423 and/or the spacer 1403 may include planes (e.g., the planes 425 and 431 of FIG. 4) corresponding to a D-shape plane (e.g., the D-shape plane 411 of FIG. 4) of the barrel 1401. For example, the lenses 1421 and 1423 and/or the spacer 1403 may globally have a disc shape or a ring shape, but may include a linear edge portion (e.g., the planes 425 and 431 of FIG. 4) by removing a partial region (e.g., a sub region) of the edge. The plane portion included in the lens 1423 and/or the spacer 1403, e.g., the D cut has already been described in more detail with reference to FIG. 7.

In an embodiment, the lenses 1421 and 1423 and/or the spacer 1403 may be received inside the barrel 1401 such that the D-shape planes or the D cuts (e.g., the planes 425 and 431 of FIG. 4) formed on the lenses 1421 and 1423 and/or the spacer 1403 are aligned to correspond to the D-shape plane (e.g., the D-shape plane 411 of FIG. 4) formed on the barrel 1401. The diameter (or radius) of the lenses 1421 and 1423 in a portion where the D cut (e.g., the plane 425 of FIG. 4) is formed may be less than that in the other portion (e.g., a portion where the D cut is not formed).

According to various embodiments, the lenses 1421 and 1423 and/or the barrel 1401 may perform auto focusing while reciprocating with respect to the image sensor along the optical axis (e.g., the optical axis O-I of FIG. 4). When auto focusing is performed, various driving devices, e.g., a voice coil motor, a step motor, an ultrasonic motor, a piezoelectric device, and the like may be used. In an embodiment, the driving device may be mounted on the D-shape plane (e.g., the D-shape plane 411 of FIG. 4) formed on the outer circumferential surface of the barrel 1401. For example, if the driving device is implemented with a voice coil motor including a coil portion and a magnetic portion, the magnetic portion may be mounted on the D-shape plane of the barrel 1401.

As described above, a lens assembly according to various embodiments of the present disclosure includes a lens that includes an effective region that refracts light, a flange region formed on at least a part around the effective region, and a first cut formed on a first sub region of the flange region, a spacer that includes a second cut formed to correspond to the first cut, and a barrel configured to receive the lens and the spacer, in which the lens and the spacer are disposed inside the barrel such that the first cut and the second cut correspond to a third cut formed on an outer circumferential surface of the barrel.

According to various embodiments, the first cut, the second cut, or the third cut may have a D-cut shape.

According to various embodiments, the lens assembly may further include another lens, and the spacer may be disposed between the lens and the another lens.

According to various embodiments, the lens may be disposed on an image sensor side, the another lens may be disposed on an object side, and a diameter of the lens may be equal to or greater than a diameter of the another lens.

According to various embodiments, the first cut may be formed on the first sub region of the lens at least based on the diameter of the another lens.

According to various embodiments, a part of the effective region may protrude outwardly from the first cut.

According to various embodiments, the electronic device may further include a driving device disposed on an outer surface of the barrel to correspond to the third cut.

An electronic device according to various embodiments of the present disclosure includes a lens in which a first cut is formed on a first sub region of a flange, a spacer in which a second cut is formed on a second sub region, and a barrel in which a third cut is formed on a third sub region of an edge portion, in which the first sub region, the second sub region, and the third sub region are disposed to correspond to each other.

According to various embodiments, the electronic device may further include another lens, in which the spacer may be disposed between the lens and the another lens.

According to various embodiments, the lens may be disposed on an image sensor side, the another lens may be disposed on an object side, and a diameter of the lens may be greater than a diameter of the another lens.

According to various embodiments, the first cut may be formed on the first sub region of the lens at least based on the diameter of the another lens.

According to various embodiments, the electronic device may further include a driving device disposed on an outer surface of the barrel to correspond to the third cut.

A lens assembly according to various embodiments of the present disclosure includes at least one lens comprising a circular effective region that refracts light and a flange formed along a circumference of the effective region, in which the flange comprises at least one first D-shape plane and a portion of the effective region protrudes outwardly from the first D-shape plane.

According to various embodiments, the flange may include at least one pair of first D-shape planes that are disposed symmetrically with respect to a center of the effective region.

According to various embodiments, the lens assembly may further include another lens, in which the lens may be disposed on an image sensor side with respect to the another lens.

According to various embodiments, the diameter of the lens may be greater than the diameter of the another lens, and at least a part of the first D-shape plane may be formed outward with respect to a flange of the another lens.

According to various embodiments, the lens assembly may further include a spacer disposed between the lens and the another lens, in which the spacer may include a second D-shape plane corresponding to the first D-shape plane.

According to various embodiments, the spacer may be disposed between the flange of the another lens and the flange of the lens to maintain an interval between the lens and the another lens.

According to various embodiments, the lens assembly may further include a barrel for sequentially receiving the another lens, the spacer, and the lens.

According to various embodiments, the barrel may include a third D-shape plane formed on an outer circumferential surface thereof, and the lens and the spacer may be mounted inside the barrel such that the first D-shape plane and the second D-shape plane correspond to the third D-shape plane.

In the lens assembly according to various embodiments of the present disclosure, a D-shape plane (e.g., a D cut) is formed on a portion of a flange that provides a means for fixing a lens onto a barrel, thereby maintaining an effective region that refracts light while reducing the entire size of the lens. For example, the lens of the lens assembly according to various embodiments of the present disclosure may be miniaturized while maintaining optical characteristics. As the lens is miniaturized, the barrel for receiving the plurality of lenses may also be reduced in size, facilitating mounting of the lens assembly on the miniaturized electronic device. For example, the electronic device including the lens assembly according to various embodiments of the present disclosure may be miniaturized.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A lens assembly comprising:
    a first lens having an effective region configured to refract light and a flange region formed on at least a part surrounding the effective region, wherein the flange region of the first lens extends outwardly from the effective region of the first lens;
    a first cut formed on a first sub region of the flange region;
    a first spacer;
    a second cut formed on the first spacer to correspond to the first cut;
    a barrel configured to receive the first lens and the first spacer; and
    a third cut formed on an outer circumferential surface of the barrel,
    wherein the first lens and the first spacer are disposed inside the barrel such that the first cut and the second cut correspond to the third cut.

2. The lens assembly of claim 1, wherein at least one of the first cut, the second cut, or the third cut has a D-cut shape.

3. The lens assembly of claim 1, further comprising a second lens, wherein the first spacer is disposed between the first lens and the second lens.

4. The lens assembly of claim 3, further comprising an image sensor side and an object side disposed opposite of the image sensor side and along a same optical axis extending through a center point of the effective region, wherein the first lens is disposed on the image sensor side, the second lens is disposed on the object side, and a diameter of the first lens is equal to or greater than a diameter of the second lens.

5. The lens assembly of claim 4, wherein the first cut is formed on the first sub region of the first lens at least based on the diameter of the second lens.

6. The lens assembly of claim 1, wherein a part of the effective region protrudes outwardly from the first cut.

7. The lens assembly of claim 1, further comprising a driving device disposed on an outer surface of the barrel to correspond to the third cut.

8. An electronic device comprising a lens assembly, wherein the lens assembly comprises:
    a first lens having an effective region configured to refract light and a flange region formed on at least a part surrounding the effective region, wherein the flange region of the first lens extends outwardly from the effective region of the first lens;
    a first cut formed on a first sub region of the flange region;
    a first spacer;
    a second cut formed on the first spacer to correspond to the first cut;
    a barrel configured to receive the first lens and the first spacer; and
    a third cut formed on an outer circumferential surface of the barrel,
    wherein the first lens and the first spacer are disposed inside the barrel such that the first cut and the second cut correspond to the third cut.

9. The electronic device of claim 8, wherein the lens assembly further comprises a second lens, wherein the first spacer is disposed between the first lens and the second lens.

10. The electronic device of claim 9, wherein the first lens is disposed on an image sensor side of the electronic device, the second lens is disposed on an object side of the electronic device opposite to the image sensor side and along an optical axis, and a diameter of the first lens is greater than a diameter of the second lens.

11. The electronic device of claim 10, wherein the first cut is formed on the first sub region of the first lens at least based on the diameter of the second lens.

12. The electronic device of claim 11, further comprising a driving device disposed on an outer surface of the barrel to correspond to the third cut.

13. The lens assembly of claim 1, wherein at least one pair of the first cut are disposed symmetrically with respect to a center of the effective region.

14. The lens assembly of claim 1, further comprising a second lens,
    wherein the first lens is disposed on an image sensor side of the lens assembly with respect to the second lens, and
    wherein each of the first lens and the second lens are disposed around an optical axis running through a center of the effective region.

15. The lens assembly of claim 14, wherein a diameter of the first lens is greater than a diameter of the second lens, and at least a part of the first cut is formed outward with respect to a flange region of the second lens.

16. The lens assembly of claim 14, wherein the first spacer is disposed between the first lens and the second lens, and the second cut is disposed corresponding to the first cut.

17. The lens assembly of claim 16, wherein the first spacer is disposed between a flange region of the second lens and a flange region of the first lens and configured to maintain an interval between the first lens and the second lens.

18. The lens assembly of claim 16, wherein the barrel receives the second lens, the first spacer, and the first lens sequentially.

* * * * *